US012626500B2

(12) United States Patent
Lee et al.

(10) Patent No.: US 12,626,500 B2
(45) Date of Patent: May 12, 2026

(54) DEVICE AND METHOD FOR FILTERING OUT A MISRECOGNIZED OBJECT

(71) Applicants: HYUNDAI MOTOR COMPANY, Seoul (KR); KIA CORPORATION, Seoul (KR)

(72) Inventors: Seo Won Lee, Seoul (KR); Young Hyun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 380 days.

(21) Appl. No.: 18/201,433

(22) Filed: May 24, 2023

(65) Prior Publication Data

US 2024/0249517 A1 Jul. 25, 2024

(30) Foreign Application Priority Data

Jan. 19, 2023 (KR) ........................ 10-2023-0008216

(51) Int. Cl.
G06V 10/98 (2022.01)
G06V 10/776 (2022.01)
G06V 20/56 (2022.01)
G06V 20/58 (2022.01)

(52) U.S. Cl.
CPC ............ G06V 10/98 (2022.01); G06V 10/776 (2022.01); G06V 20/58 (2022.01); G06V 20/588 (2022.01)

(58) Field of Classification Search
USPC ....................................................... 382/103
See application file for complete search history.

(56) References Cited

U.S. PATENT DOCUMENTS

| | | | | |
|---|---|---|---|---|
| 12,055,941 | B1 * | 8/2024 | Crego ................... | G05D 1/0214 |
| 2012/0148103 | A1 * | 6/2012 | Hampel ................. | G06T 7/254 |
| | | | | 382/103 |
| 2015/0310631 | A1 * | 10/2015 | Feris ....................... | G06T 7/187 |
| | | | | 348/143 |
| 2016/0086050 | A1 * | 3/2016 | Piekniewski .......... | B25J 9/1664 |
| | | | | 382/103 |
| 2017/0308770 | A1 * | 10/2017 | Jetley ..................... | G06N 3/084 |
| 2018/0342070 | A1 * | 11/2018 | Chen ...................... | G06V 20/52 |
| 2019/0258251 | A1 * | 8/2019 | Ditty .................... | G05D 1/0088 |
| 2020/0025877 | A1 * | 1/2020 | Sarkis ..................... | G01S 7/412 |
| 2022/0172390 | A1 * | 6/2022 | Redford ................. | G06T 7/285 |
| 2022/0180117 | A1 * | 6/2022 | Chiu ....................... | G06F 18/22 |
| 2022/0309694 | A1 * | 9/2022 | Nobayashi ........... | G06V 20/588 |

(Continued)

OTHER PUBLICATIONS

Lee et al. (Seung Ii, Lee and Hyun Kim, "GaussianMask: Uncertainty-aware Instance Segmentation based on Gaussian Modeling", 2022 26th International Conference on Pattern Recognition (ICPR), DOI: 10.1109/ICPR56361.2022.9956515) (Year: 2022).*

*Primary Examiner* — Chineyere Wills-Burns
*Assistant Examiner* — Aaron Timothy Bonansinga
(74) *Attorney, Agent, or Firm* — Lempia Summerfield Katz LLC

(57) ABSTRACT

A device for filtering out an object includes a camera sensor that captures an image of the surroundings of a vehicle. The device includes a controller that recognizes the object and a road area in the image, determines a target area corresponding to the object, determines whether or not the object is a misrecognized object based on the target area, and deletes the misrecognized object from the image.

16 Claims, 14 Drawing Sheets

510
610
630 620

(56) References Cited

U.S. PATENT DOCUMENTS

| | | | |
|---|---|---|---|
| 2023/0146926 A1* | 5/2023 | Gorantla | ............ G01C 21/3804 |
| | | | 701/450 |
| 2023/0394691 A1* | 12/2023 | Guizilini | ............... G01S 13/931 |
| 2023/0410486 A1* | 12/2023 | Tian | ....................... G06V 20/58 |

* cited by examiner

310

510
610
630 620

| Car | Easy | | Moderate | | Hard | |
|---|---|---|---|---|---|---|
| | Orig. | Rev. | Orig. | Rev. | Orig. | Rev. |
| F1-Score | 94.67 | 94.76 | 88.82 | 91.04 | 37.05 | 37.58 |
| NORMAL RECOGNITION (TP) | 31563 | 30856 | 32350 | 32057 | 676 | 682 |
| MISRECOGNITION (FP) | 1895 | 1040 | 6078 | 3949 | 748 | 712 |
| UNRECOGNITION (FN) | 1656 | 2375 | 2067 | 2363 | 1559 | 1554 |

FIG.10

DEVICE AND METHOD FOR FILTERING OUT A MISRECOGNIZED OBJECT

CROSS-REFERENCE TO RELATED APPLICATION

This application claims the benefit of priority to Korean Patent Application No. 10-2023-0008216, filed in the Korean Intellectual Property Office on Jan. 19, 2023, the entire contents of which are incorporated herein by reference.

TECHNICAL FIELD

The present disclosure relates to a technology for filtering out an object misrecognized by an image recognition system (or image recognition algorithm) mounted on an autonomous vehicle.

BACKGROUND

In general, an artificial neural network (ANN) is a field of artificial intelligence and is an algorithm for allowing a machine to be trained by simulating a human neural structure. Recently, ANN technology has been applied to image recognition, voice recognition, natural language processing, and the like, and has shown excellent effects. The artificial neural network consists of an input layer that receives an input, a hidden layer that learns, and an output layer that returns the results of operations. A deep neural network (DNN) with multiple hidden layers is also a kind of artificial neural network.

The artificial neural network allows a computer to learn from data. When trying to solve a problem using the artificial neural network, what is to be prepared is a suitable artificial neural network model and data to be analyzed. The artificial neural network model to solve a problem is trained based on data. Before training the model, the data is first properly processed. The reason for this is that input data and output data required by the artificial neural network model are regularized. Therefore, a process of preprocessing acquired raw data to be suitable for required input data is required. After the preprocessing is completed, the processed data needs to be divided into two types. The data needs to be classified into a training dataset and a validation dataset. The training dataset is used to train the model and the validation dataset is used to verify the performance of the model.

There are several reasons for validating the artificial neural network model. Artificial neural network developers perform tuning of the model by modifying hyperparameters of the model based on the verification result of the model. In addition, the artificial neural network developers verify models in order to select which model is suitable among several models. The reasons why model verification is necessary are explained in more detail as follows.

The first reason is to predict accuracy. The purpose of artificial neural networks is to achieve good performance on out-of-sample data that is not used for training. Therefore, after creating the model, it is necessary to check how well the model performs on out-of-sample data. However, it is required to not validate the model using the training dataset. Thus, the accuracy of the model needs to be measured using the validation dataset separate from the training dataset.

The second reason is to improve the performance of the model by tuning the model. For example, overfitting may be prevented. Overfitting refers to a state where a model is overtrained on the training dataset. For example, when the training accuracy is high, but the validation accuracy is low, it may be suspected that overfitting has occurred. In addition, overfitting may be figured out in more detail through training loss and validation loss. Preventing overfitting increases the validation accuracy. Overfitting may be prevented by using methods such as regularization or dropout.

On the other hand, an image recognition system (or image recognition algorithm) mounted in an autonomous vehicle often misrecognizes an object on a road. This may weaken the performance stability of an autonomous driving system as well as reduce the user's reliability of the autonomous vehicle.

To solve this problem, various methods have been proposed to improve the performance of image recognition algorithms (or image recognition networks) based on deep learning. However, the possibility of misrecognition of objects on real roads cannot be completely ruled out. In particular, even in the case of a method of further performing a vanishing point-based post-processing process, misrecognition of a structure located on an actual road (e.g., a lava cone, a construction sign, a toll gate structure, or the like) may occur. Objects misrecognized around the median of a road cannot be filtered out.

The subject matter described in this background section are prepared to enhance understanding of the background of the present disclosure. The background section may include subject matter other than the prior art already known to those of ordinary skill in the field to which this technology belongs.

SUMMARY

The present disclosure has been made to solve the above-mentioned problems occurring in the prior art while advantages achieved by the prior art are maintained intact.

An aspect of the present disclosure is to provide a device and a method for filtering out a misrecognized object. The device and method recognize at least one object and a road area in an image using a deep learning-based image recognition model. The device and method also determine a target area corresponding to each object in the image and detect a misrecognized object by performing two-dimensional (2D) Gaussian filtering on each target area. The device and method also delete the misrecognized object from the image. This allows an autonomous vehicle to recognize objects located on a road with high accuracy. This also allows a user to improve the reliability of the autonomous vehicle.

An embodiment of the present disclosure may determine a target area corresponding to each object based on a separation distance to each object. The target area may not be an area including the object but may be an area located downward of the object.

To determine the target area corresponding to each object, an embodiment of the present disclosure may provide a look-up table in which a margin and a scale are recorded for each separation distance from the object (e.g., a separation distance between the autonomous vehicle and the object or a separation distance between a camera sensor 20 and the object). The margin may represent the separation distance between the object and the target area, and the scale may represent the scale of the target area.

An embodiment of the present disclosure may: calculate the sum of the results obtained by sequentially applying a 2D Gaussian mask within one target area; reduce the score of the object corresponding to the target area in proportion to the average of the sum when the average of the sum is less than a first threshold; and delete the object from the image when the score of the object is less than a second threshold. The accuracy and reliability of image recognition for autonomous vehicles are thereby improved.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a device for filtering out an object includes a camera sensor that captures an image of surroundings of a vehicle. The device also includes a controller that recognizes the object and a road area in the image, determines a target area corresponding to the object, determines whether or not the object is a misrecognized object based on the target area, and deletes the misrecognized object from the image.

According to an embodiment, the controller may determine an area located downward of the object as a target area.

According to an embodiment, the controller may determine the target area corresponding to the object based on a separation distance from the object.

According to an embodiment, the controller may determine a margin and a scale of the target area corresponding to the object based on a separation distance from the object.

According to an embodiment, the controller may determine whether the object is misrecognized by performing 2D Gaussian filtering on the target area.

According to an embodiment, the controller may determine whether the object is the misrecognized object by performing 2D Gaussian filtering on the target area of the object when a reliability value of the object is less than or equal to a preset value.

According to an embodiment, the controller may calculate a total sum of results obtained by sequentially applying a 2D Gaussian mask within the target area. The controller may also reduce a score of the object corresponding to the target area in proportion to an average of the sum when the average of the sum is less than a first threshold. The controller may further determine that the object is the misrecognized object when the score of the object is less than a second threshold.

According to an embodiment, the controller may change the first threshold according to a separation distance from the object.

According to an embodiment, the controller may reduce the first threshold as a separation distance from the object decreases.

According to an aspect of the present disclosure, a method for filtering out an object includes: capturing, by a camera sensor, an image of surroundings of a vehicle; recognizing, by a controller, the object and a road area in the image; determining, by the controller, a target area corresponding to the object; determining, by the controller, whether or not the object is a misrecognized object based on the target area; and deleting, by the controller, the misrecognized object from the image.

According to an embodiment, determining the target area corresponding to the object may include determining, by the controller, an area located downward of the object as the target area.

According to an embodiment, determining the target area corresponding to the object may include determining, by the controller, the target area corresponding to the object based on a separation distance from the object.

According to an embodiment, determining the target area corresponding to the object may include determining, by the controller, a margin and a scale of the target area corresponding to the object based on a separation distance from the object.

According to an embodiment, determining whether or not the object is the misrecognized object may include determining, by the controller, whether the object is misrecognized by performing 2D Gaussian filtering on the target area.

According to an embodiment, determining whether or not the object is the misrecognized object may include determining, by the controller, whether the object is the misrecognized object by performing 2D Gaussian filtering on the target area of the object when a reliability value of the object is less than or equal to a preset value.

According to an embodiment, determining whether or not the object is the misrecognized object may include: calculating, by the controller, a sum of results obtained by sequentially applying a 2D Gaussian mask within the target area; reducing, by the controller, a score of the object corresponding to the target area in proportion to an average of the sum when the average of the sum is less than a first threshold; and determining, by the controller, that the object is the misrecognized object when the score of the object is less than a second threshold.

According to an embodiment, reducing the score of the object corresponding to the target area in proportion to the average of the sum may include changing, by the controller, the first threshold according to a separation distance from the object.

According to an embodiment, reducing the score of the object corresponding to the target area in proportion to the average of the total sum may include reducing, by the controller, the first threshold as a separation distance from the object decreases.

BRIEF DESCRIPTION OF THE DRAWINGS

The above and other objects, features, and advantages of the present disclosure should be more apparent from the following detailed description taken in conjunction with the accompanying drawings.

5
6

Figure 8:
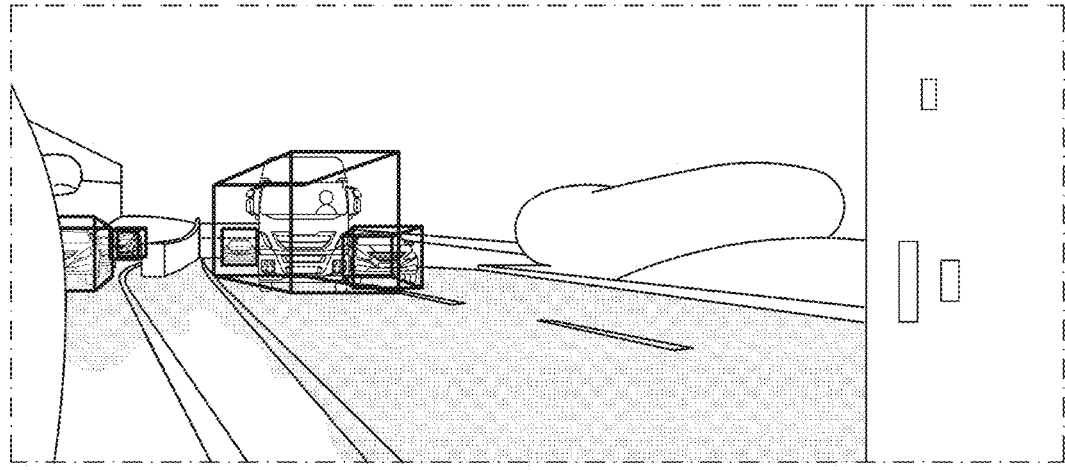

FIG. 8 is a view showing the result of deleting a misrecognized object in a controller included in a device for filtering out a misrecognized object in an image according to an embodiment of the present disclosure.

Figure 9A:
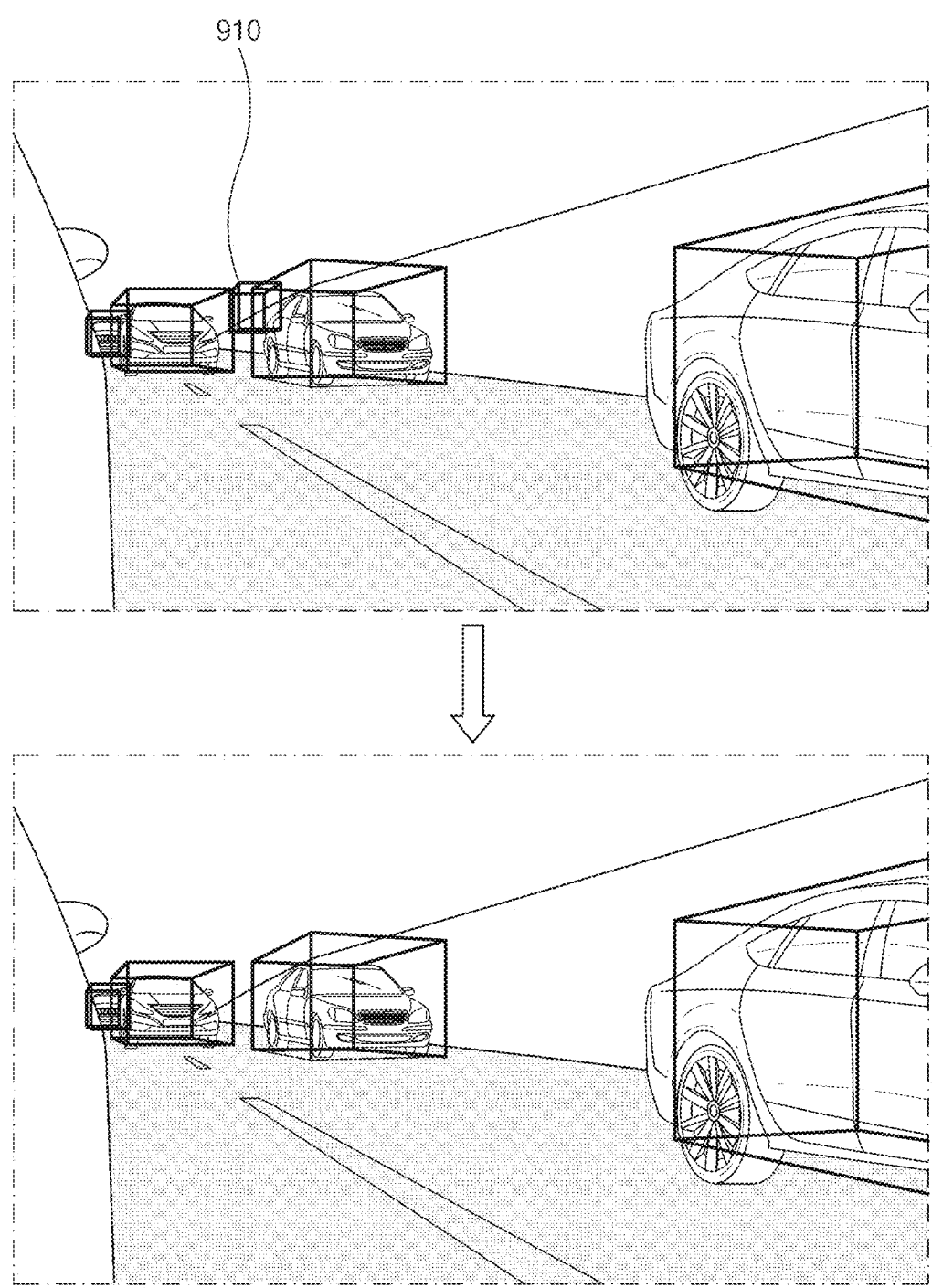

FIG. 9A is a first diagram illustrating the performance of a device for filtering out a misrecognized object in an image according to an embodiment of the present disclosure.

Figure 9B:
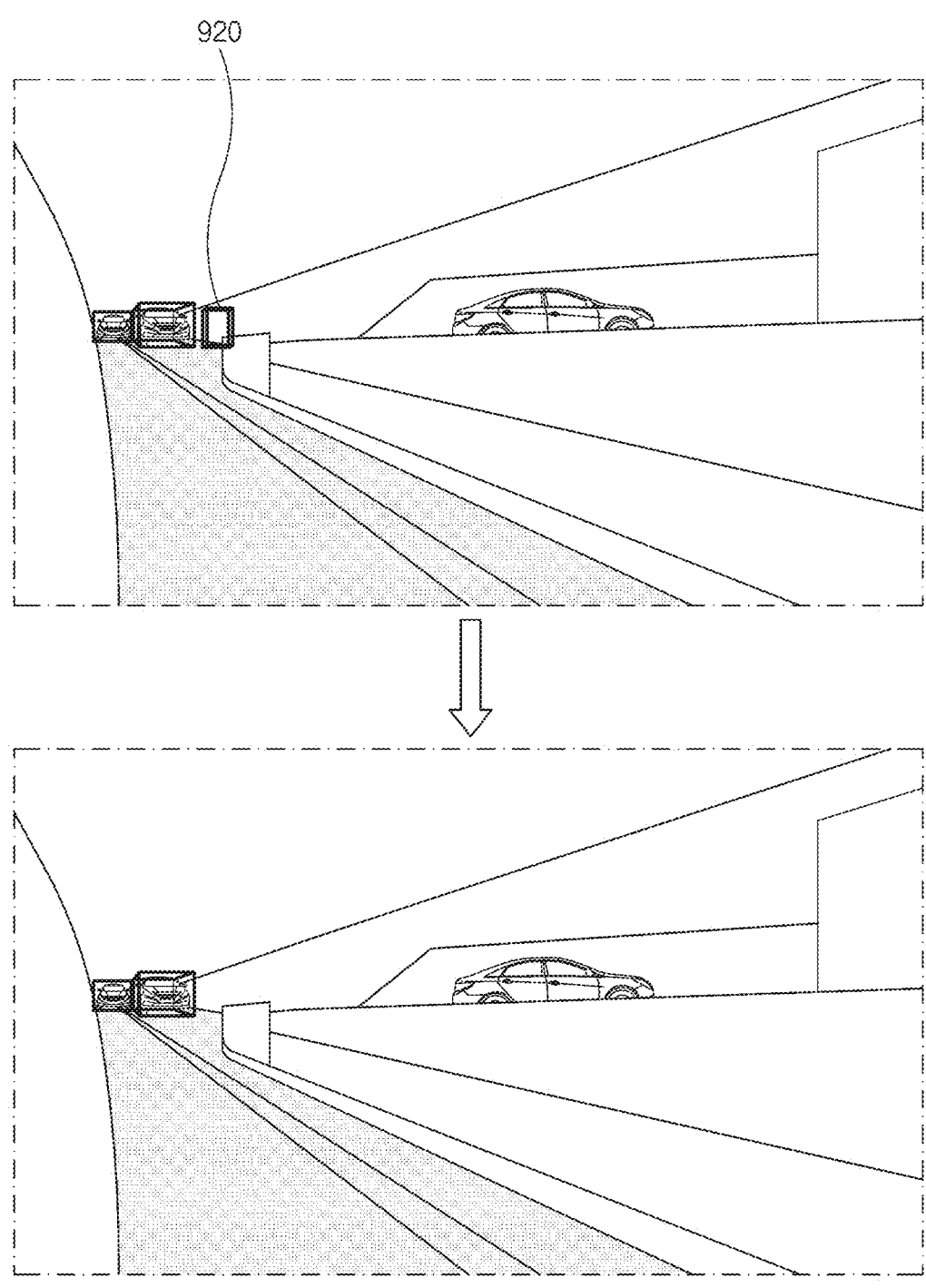

FIG. 9B is a second diagram illustrating the performance of a device for filtering out a misrecognized object in an image according to an embodiment of the present disclosure.

Figure 9C:
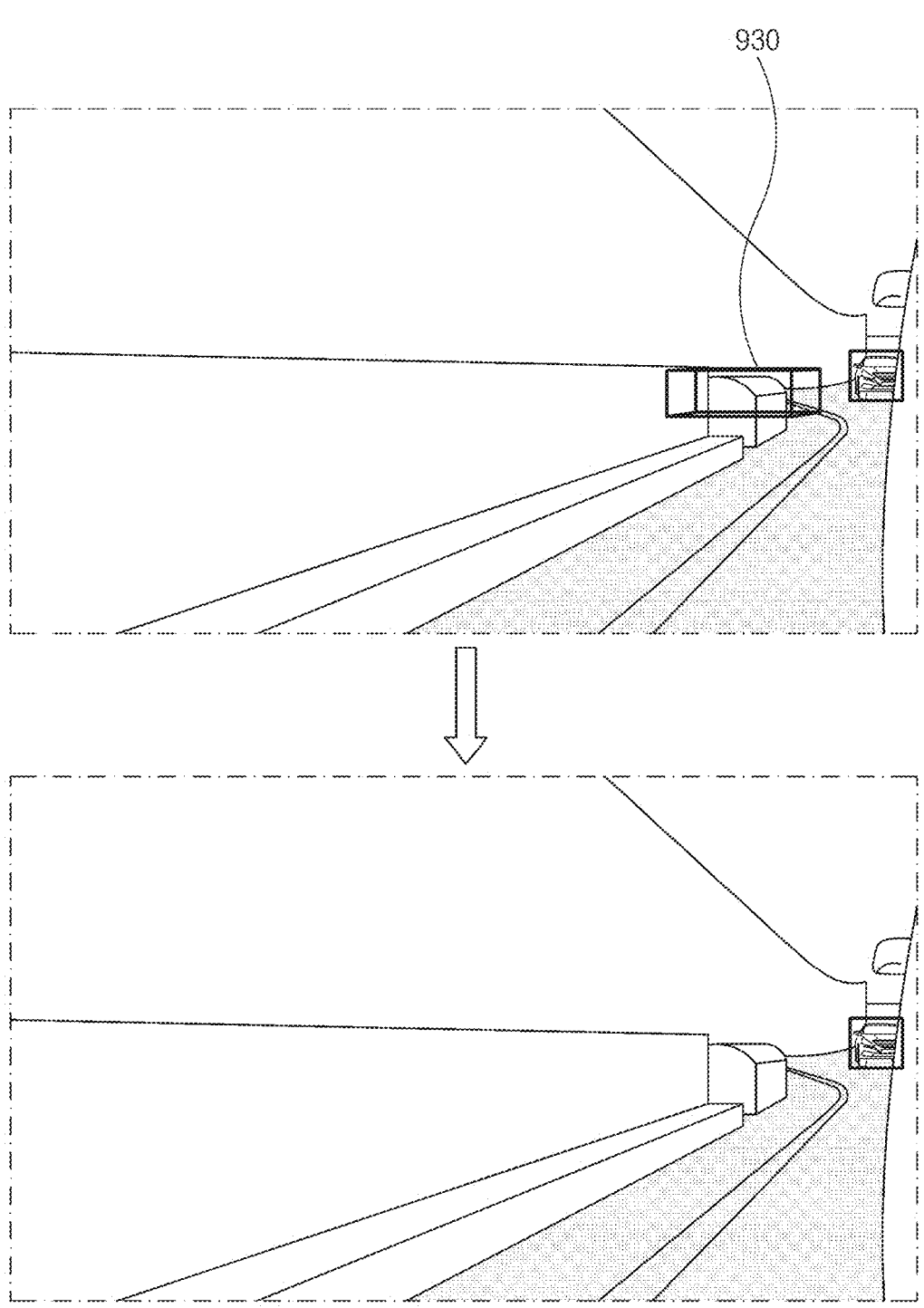

FIG. 9C is a third diagram illustrating the performance of a device for filtering out a misrecognized object in an image according to an embodiment of the present disclosure.

FIG. 10 is a performance analysis diagram of a device for filtering out a misrecognized object in an image according to an embodiment of the present disclosure.

Figure 11:
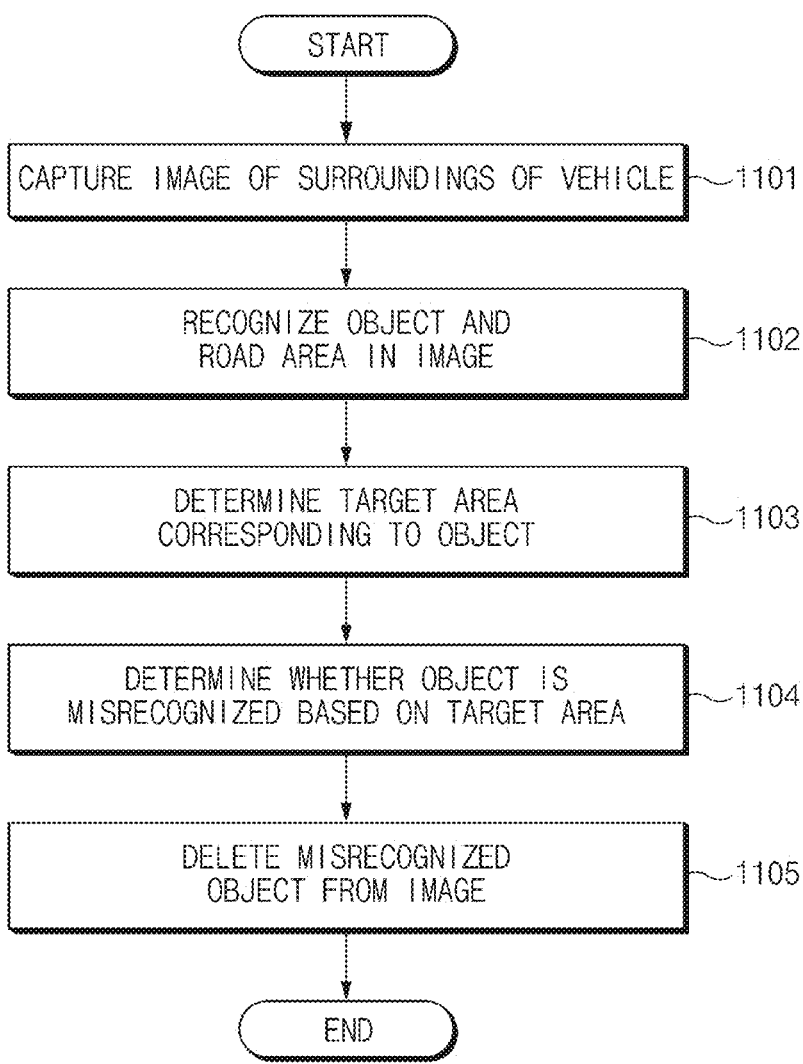

FIG. 11 is a flowchart of a method of filtering out a misrecognized object in an image according to an embodiment of the present disclosure.

Figure 12:
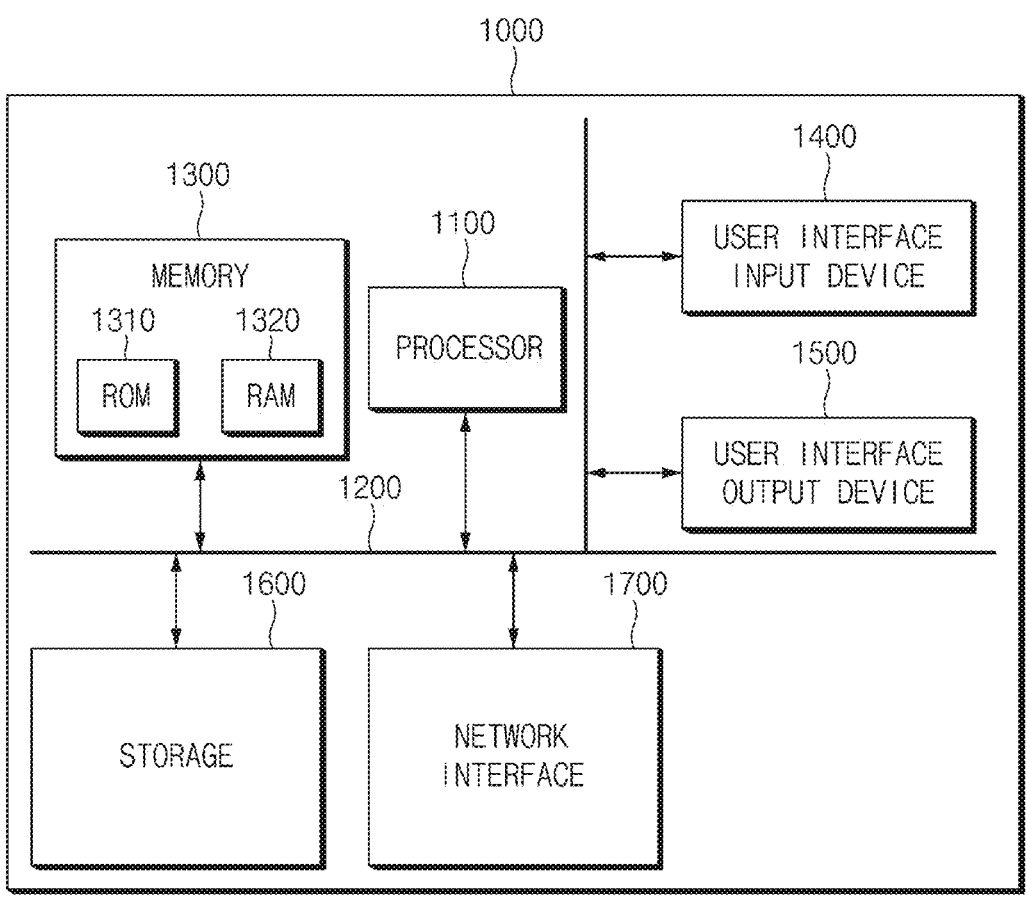

FIG. 12 is a block diagram illustrating a computing system for executing a method of filtering out a misrecognized object in an image according to an embodiment of the present disclosure.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing embodiments of the present disclosure, a detailed description of well-known features or functions has been ruled out in order to not unnecessarily obscure the gist of the present disclosure. When a component, device, element, or the like, of the present disclosure, is described as having a purpose or performing an operation, function, or the like, the component, device, or element should be considered herein as being "configured to" meet that purpose or to perform that operation or function.

In describing the components of embodiments according to the present disclosure, terms such as first, second, "A", "B", (a), (b), and the like may be used. These terms are merely intended to distinguish one component from another component. These terms do not limit the nature, sequence, or order of the constituent components. Unless otherwise defined, all terms used herein, including technical or scientific terms, have the same meanings as those generally understood by those having ordinary skill in the art to which the present disclosure pertains. Terms defined in a generally used dictionary are to be interpreted as having meanings consistent with the contextual meanings in the relevant field of art. Such terms are not to be interpreted as having ideal or excessively formal meanings unless clearly defined as having such in the present application.

Figure 1:
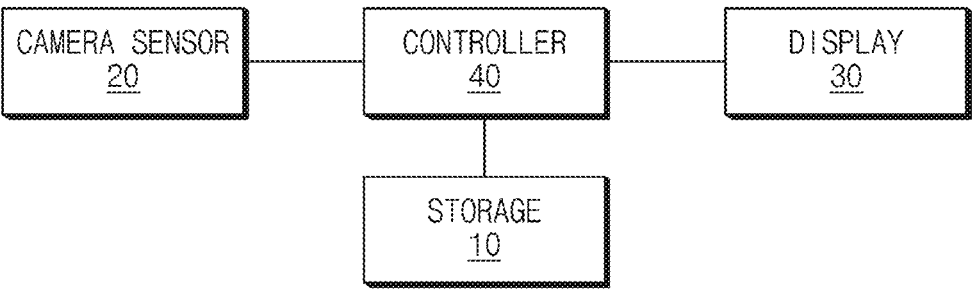
FIG. 1 is a configuration diagram of a device for filtering out a misrecognized object in an image according to an embodiment of the present disclosure.

FIG. 1 is a configuration diagram of a device for filtering out a misrecognized object in an image according to an embodiment of the present disclosure.

Referring to FIG. 1, a device for filtering out a misrecognized object in an image according to an embodiment of the present disclosure may include a storage 10, a camera sensor 20, a display 30, and a controller 40. According to a method of implementing the device for filtering out a misrecognized object in an image according to an embodiment of the present disclosure, the components may be combined with each other as one entity or some components may be omitted.

The above components are described below. First, the storage 10 may store various logic, algorithms, and programs required in the process of recognizing at least one object and a road area in an image. The logic, algorithms, and programs may use a deep learning-based image recognition model, determining a target area corresponding to each object in the image. The logic, algorithms, and programs may detect a misrecognized object by performing two-dimensional (2D) Gaussian filtering on each target area and delete the misrecognized object from the image.

The storage 10 may store various logic, algorithms, and programs required in the process of determining a target area corresponding to each object based on a separation distance from each object. The target area may not be an area including the object, but instead may be an area located downward, i.e., vertically downward of or below the object (e.g., a road area).

The separation distance from each object may include, for example, a longitudinal distance from each object.

To determine the target area corresponding to each object, the storage 10 may store a lookup table in which margins and scales are recorded for the separation distance from each object (for example, a distance between an autonomous vehicle and the object or a distance between the camera sensor 20 and the object). The margin may represent the separation distance between the object and the target area and the scale may represent the scale of the target area.

Here, the lookup table may include various types of data material or relational expressions including margins and scales corresponding to each separation distance. It should be apparent that the lookup table is not limited to a specific table or table form.

For example, the lookup table may be configured such that a margin and a scale increase as the separation distance increases. For example, if the margin is m1 and the scale is s1 when the separation distance is z1, the margin may be m2 (m1<m2) and the scale may be s2 (s1<s2) when the separation distance is z2 (z1<z2).

Also, according to embodiments of the present disclosure, values representing the distance z, the margin m, and the scale s may be expressed in a one-dimensional form, a two-dimensional form, or a three-dimensional form.

The storage 10 may store various logic, algorithms, and programs required in the process of: calculating the sum of the results obtained by sequentially applying a 2D Gaussian mask within one target area; reducing the score of the object corresponding to the target area in proportion to the average of the sum when the average of the sum is less than a first threshold; and deleting the object from the image when the score of the object is less than a second threshold.

The storage 10 may store an image recognition model for which training has been completed. The image recognition model may recognize not only various objects (e.g., vehicles, traffic lights, median strips, guardrails, and the like) in images but also road areas. As an example, the image recognition model is shown in FIG. 2.

Figure 2:
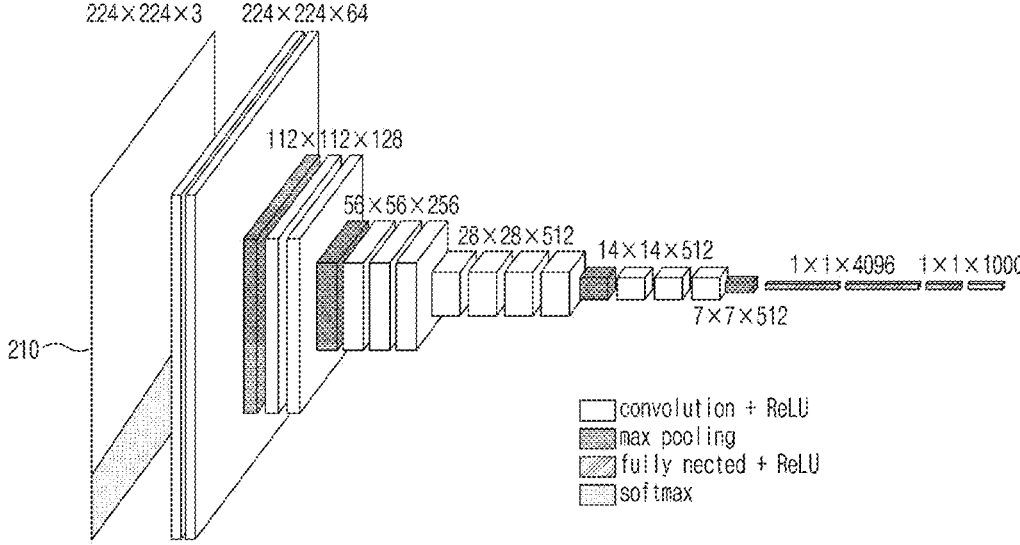
FIG. 2 is a view of an image recognition model included in a device for filtering out a misrecognized object in an image according to an embodiment of the present disclosure.

FIG. 2 is a view of an image recognition model included in a device for filtering out a misrecognized object in an image according to an embodiment of the present disclosure.

Referring to FIG. 2, the deep learning-based image recognition model may have a neural network structure composed of a plurality of convolutions, batch-normalization, an activation layer, and the like, and may output both 2D detection results, 3D detection results, and segmentation results for an object with respect to the input image 210 because the detection head and the segmentation head are separated.

For example, the detection head may output bounding box information (Xmin, Ymin, Xmax, Ymax) of an object in an image as 2D information, object information in a 3D coordinate system as 3D information, and class information indicating the type of the object or the detection reliability value of the object. The 3D information may include 3D position (x, y, z) information of the object, scale information (e.g., full height, full width, full length) of the object and entry angle information of the object. In addition, the segmentation head may output a recognition result in two channels, i.e., a road area and a non-road area. This is shown in FIG. 3.

Figure 3:
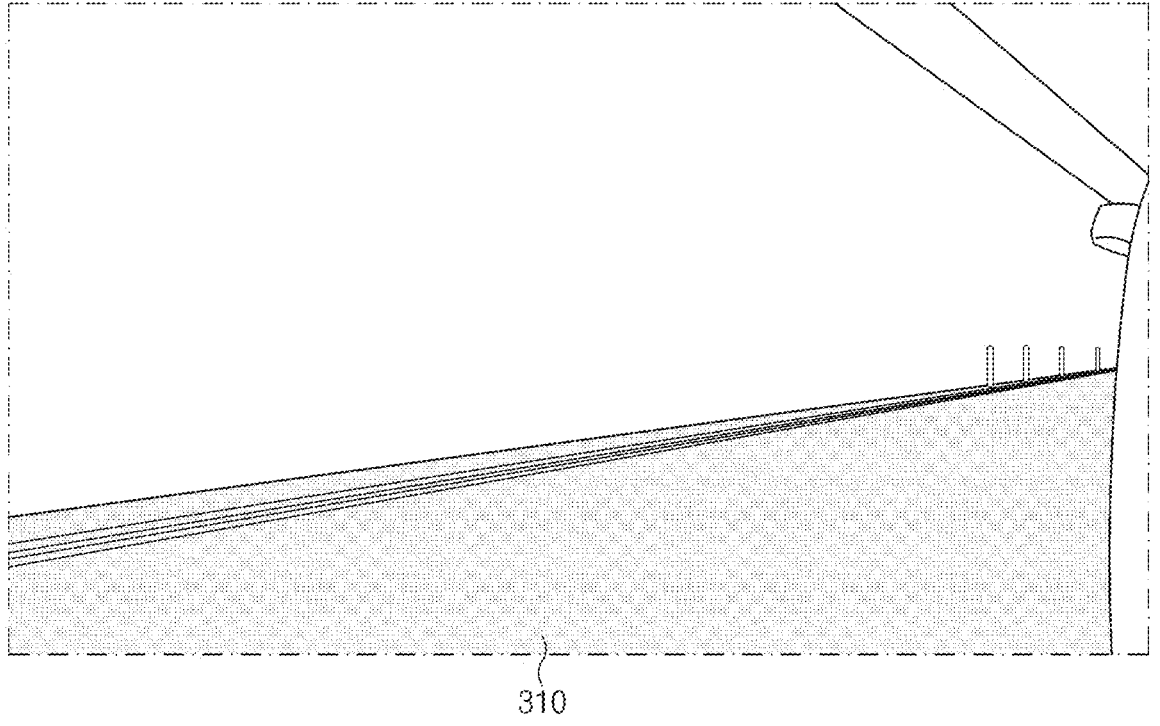
FIG. 3 is a view of a road area output by an image recognition model provided in a device for filtering out a misrecognized object in an image according to an embodiment of the present disclosure.

FIG. 3 is a view of a road area output by an image recognition model provided in a device for filtering out a misrecognized object in an image according to an embodiment of the present disclosure.

Referring to FIG. 3, the segmentation head of an image recognition model may detect a road area 310 within an image.

The storage 10 may include at least one type of storage medium of memories such as a flash memory type memory, a hard disk type memory, a micro type memory, and a card type memory (e.g., a Secure Digital (SD) card or an eXtream Digital (XD) Card), a Random-Access Memory (RAM), a Static RAM (SRAM), a Read-Only Memory (ROM), a Programmable ROM (PROM), an Electrically Erasable PROM (EEPROM), a Magnetic RAM (MRAM), and an optical disk type memory.

The camera sensor 20 may be a module mounted on a vehicle to capture an image of the surroundings of the vehicle. The camera sensor 20 may include a front camera sensor, a rear camera sensor, a left side camera sensor, and a right side camera sensor. As an example, an image of the vehicle's surroundings captured by the left side camera sensor is shown in FIG. 4.

Figure 4:
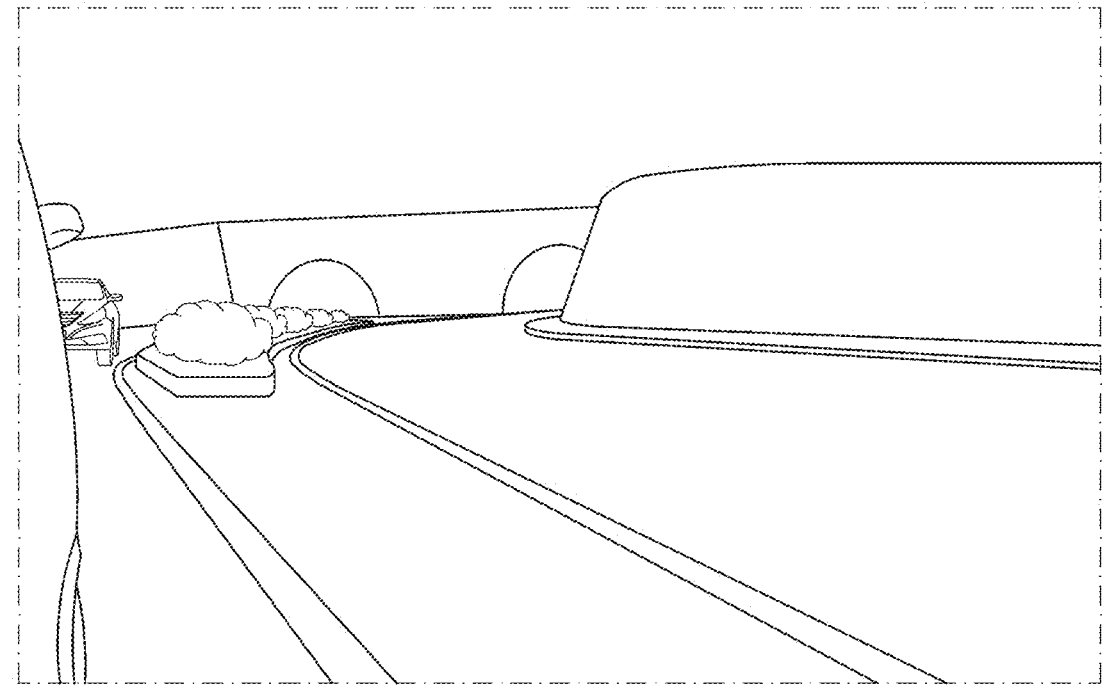
FIG. 4 is a diagram illustrating an image of the surroundings of a vehicle captured by a left side camera sensor provided in a device for filtering out a misrecognized object in an image according to an embodiment of the present disclosure.

FIG. 4 is a diagram illustrating an image of the surroundings of a vehicle captured by a left side camera sensor provided in a device for filtering out a misrecognized object in an image according to an embodiment of the present disclosure.

Referring to FIG. 4, the left side camera sensor may be located at the lower end of the left side mirror of the vehicle and, therefore, may capture an image of the rear left side of the vehicle.

The display 30 may display an image of the surroundings of the vehicle captured by the camera sensor 20, and in addition, display objects other than objects filtered out by the controller 40 among objects recognized by an image recognition model.

The controller 40 may perform overall control such that each of the above components normally performs its function. The controller 40 may be implemented in the form of hardware or software or may be implemented in a combination of hardware and software. The controller 40 may be implemented with a microprocessor but is not limited thereto.

The controller 40 may perform a variety of control in the process of recognizing at least one object and a road area in an image using a deep learning-based image recognition model. The controller may determine a target area corresponding to each object in the image, detect a misrecognized object by performing 2D Gaussian filtering on each target area, and delete the misrecognized object from the image.

The controller 40 may determine a target area corresponding to each object based on the separation distance from each object. The target area may not be an area including the object, but an area located downward of the object (e.g., a road area).

The controller 40 may determine a target area corresponding to each object based on a look-up table in which a margin and a scale are recorded for each separation distance from the object (e.g., a separation distance between the autonomous vehicle and the object or a separation distance between the camera sensor 20 and the object). The margin may represent the separation distance between the object and the target area and the scale may represent the scale of the target area.

The controller 40 may: calculate the sum of the results obtained by sequentially applying a 2D Gaussian mask within one target area; reduce the score of the object corresponding to the target area in proportion to the average of the sum when the average of the sum is less than a first threshold; and delete the object from the image when the score of the object is less than a second threshold.

Hereinafter, the operation of the controller 40 is described in detail with reference to FIGS. 5-8.

Figure 5:
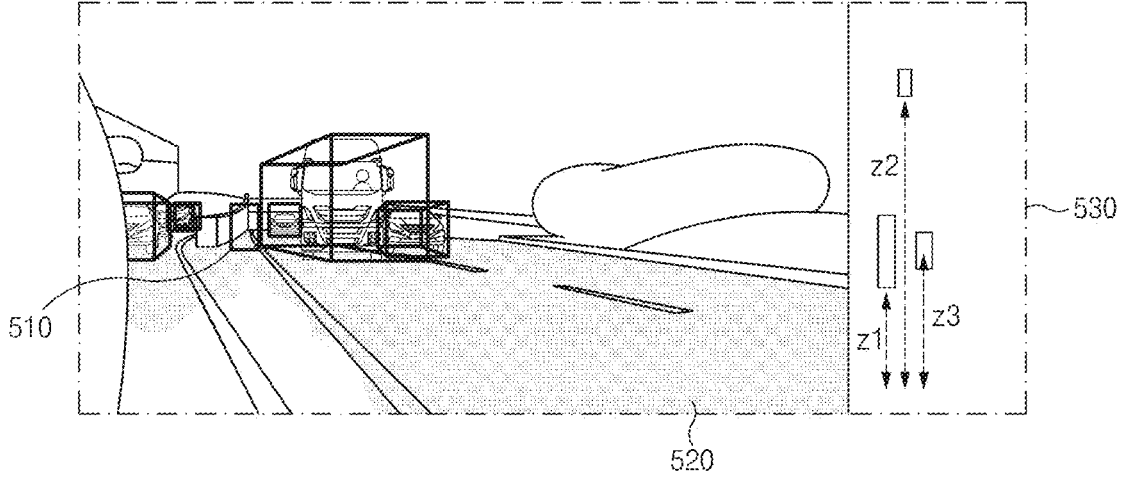
FIG. 5 is a view showing results recognized by an image recognition model included in a device for filtering out a misrecognized object in an image according to an embodiment of recognized present disclosure.

FIG. 5 is a view showing results recognized by an image recognition model included in a device for filtering out a misrecognized object in an image according to an embodiment of recognized present disclosure.

In FIG. 5, '510' represents objects recognized by an image recognition model, '520' represents a road area recognized by the image recognition model, and '530' represents distances from the objects (z1, z2, and z3).

Hereinafter, a process of detecting a misrecognized object among objects recognized by the image recognition model in the controller 40 is described by taking one object 510 among a plurality of objects as an example.

Figure 6:
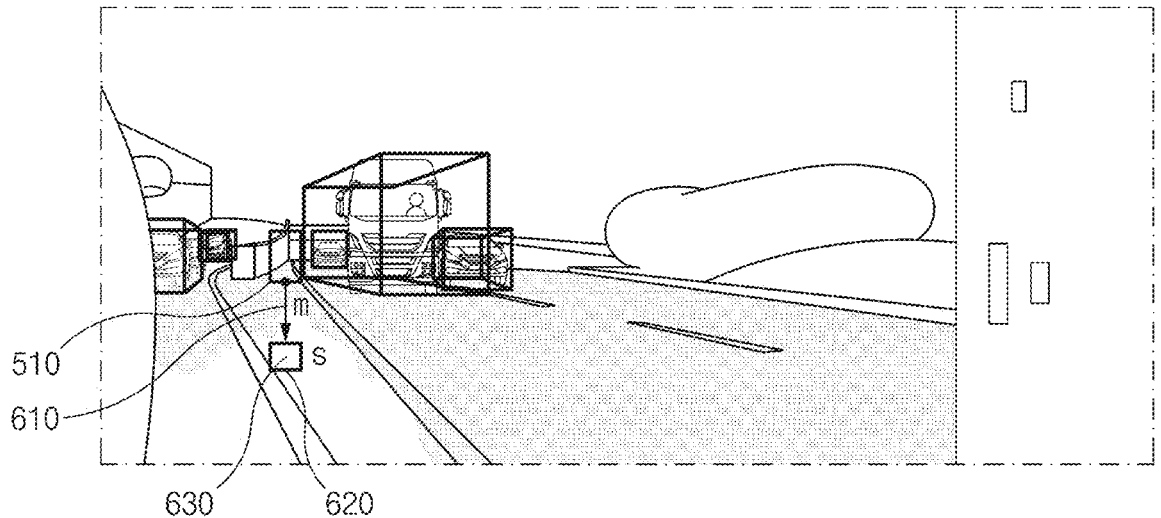
FIG. 6 is a view showing a process of determining a target area for an object in a controller included in a device for filtering out a misrecognized object in an image according to an embodiment of the present disclosure.

FIG. 6 is a view showing a process of determining a target area for an object in a controller included in a device for filtering out a misrecognized object in an image according to an embodiment of the present disclosure.

First, the controller 40 may determine that objects having a reliability value greater than a preset value are not misrecognized objects among objects recognized by the image recognition model. In other words, the controller 40 may determine whether or not objects having a reliability value less than or equal to the preset value are a misrecognized object among objects recognized by the image recognition model.

As shown in FIG. 6, the controller 40 may detect a separation distance from the object 510 and determine a margin and a scale corresponding to the separation distance. For example, the controller 40 may search for a margin n and a scale corresponding to the separation distance from a lookup table.

Thereafter, the controller 40 may determine a target area 630 having a scale 620 with a margin 610 downward from the center of the lower end of the object 510. For example, because the scale varies according to the separation distance, the determined size of the target area 630 may also vary according to the separation distance.

Figure 7:
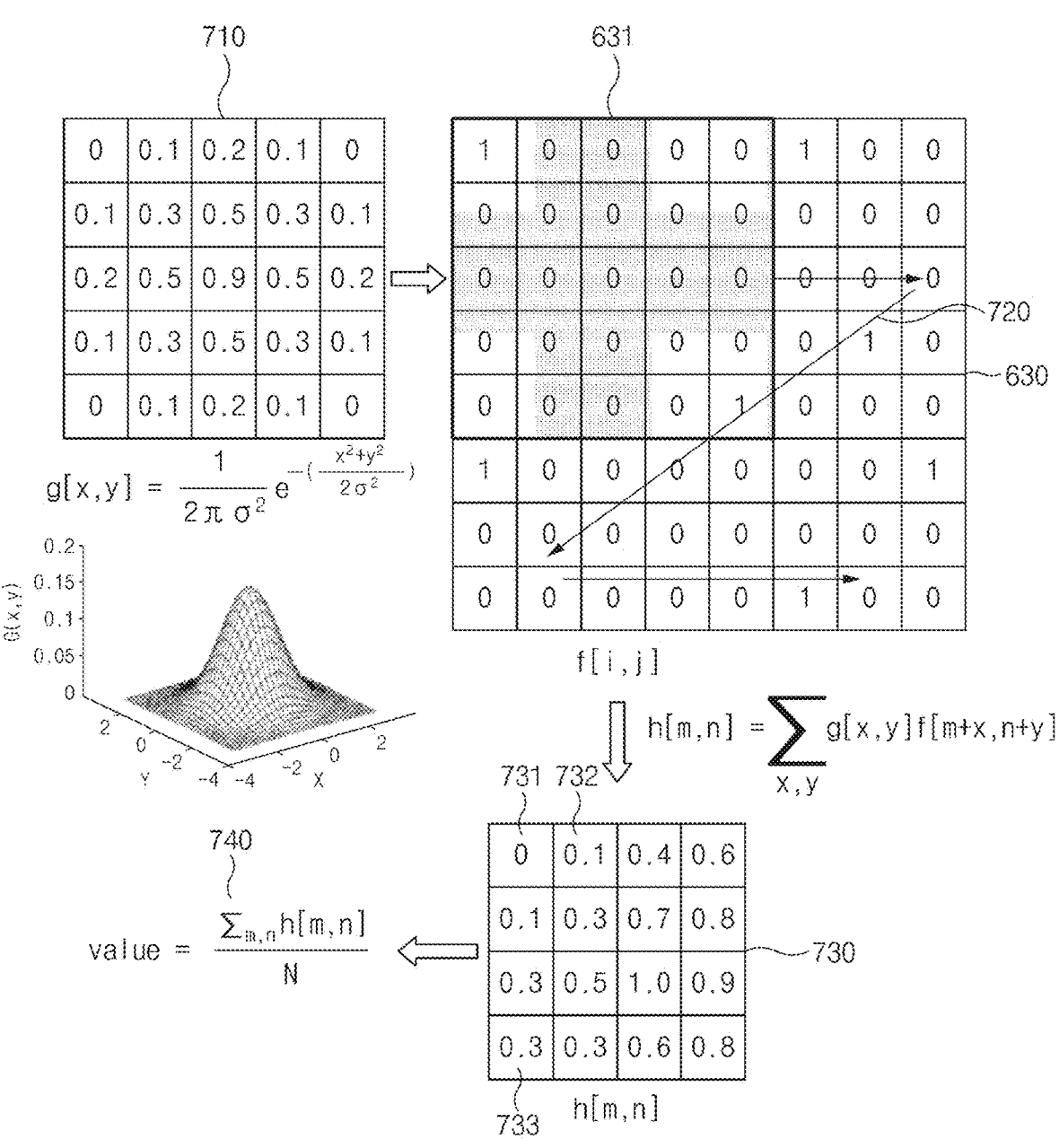
FIG. 7 is a view showing a process of determining a misrecognized object in a controller included in a device for filtering out a misrecognized object in an image according to an embodiment of the present disclosure.

FIG. 7 is a view showing a process of determining a misrecognized object in a controller included in a device for filtering out a misrecognized object in an image according to an embodiment of the present disclosure.

In FIG. 7, '710' represents a 2D Gaussian mask, values in the target area 630 represent a road area (1) and a non-road area (0), '720' represents sequences in which the 2D Gaussian mask 710 is applied to the target area 630, and '730' represents a result of sequentially applying the 2D Gaussian mask 710 in the target area 630.

As shown in FIG. 7, the controller 40 may obtain zero (731) as a result of applying the 2D Gaussian mask 710 to a first area 631 of the target area 630. The controller 40 may obtain each field value of '730' by multiplying each field value of the 2D Gaussian mask 710 and each field value of the first area 631 corresponding thereto.

For example, the result of applying the 2D Gaussian mask 710 to the first area 631 of the target area 630 is shown in Table 1 below. In Table 1, when all field values are added, zero (731) is obtained.

TABLE 1

| | | | | |
|---|---|---|---|---|
| $0 \times 1 = 0$ | $0.1 \times 0 = 0$ | $0.2 \times 0 = 0$ | $0.1 \times 0 = 0$ | $0 \times 0 = 0$ |
| $0.1 \times 0 = 0$ | $0.3 \times 0 = 0$ | $0.5 \times 0 = 0$ | $0.3 \times 0 = 0$ | $0.1 \times 0 = 0$ |
| $0.2 \times 0 = 0$ | $0.5 \times 0 = 0$ | $0.9 \times 0 = 0$ | $0.5 \times 0 = 0$ | $0.2 \times 0 = 0$ |
| $0.1 \times 0 = 0$ | $0.3 \times 0 = 0$ | $0.5 \times 0 = 0$ | $0.3 \times 0 = 0$ | $0.1 \times 0 = 0$ |
| $0 \times 0 = 0$ | $0.1 \times 0 = 0$ | $0.2 \times 0 = 0$ | $0.1 \times 0 = 0$ | $0 \times 1 = 0$ |

As another example, the result of applying the 2D Gaussian mask 710 to the second area of the target area 630 is shown in Table 2 below. Here, the second area may represent an area obtained by shifting the first area 631 to the right by one space in the target area 630. In Table 2, when all field values are added, 0.1 is obtained. (732)

TABLE 2

| | | | | |
|---|---|---|---|---|
| $0 \times 0 = 0$ | $0.1 \times 0 = 0$ | $0.2 \times 0 = 0$ | $0.1 \times 0 = 0$ | $0 \times 1 = 0$ |
| $0.1 \times 0 = 0$ | $0.3 \times 0 = 0$ | $0.5 \times 0 = 0$ | $0.3 \times 0 = 0$ | $0.1 \times 0 = 0$ |
| $0.2 \times 0 = 0$ | $0.5 \times 0 = 0$ | $0.9 \times 0 = 0$ | $0.5 \times 0 = 0$ | $0.2 \times 0 = 0$ |
| $0.1 \times 0 = 0$ | $0.3 \times 0 = 0$ | $0.5 \times 0 = 0$ | $0.3 \times 0 = 0$ | $0.1 \times 0 = 0$ |
| $0 \times 0 = 0$ | $0.1 \times 0 = 0$ | $0.2 \times 0 = 0$ | $0.1 \times 1 = 0.1$ | $0 \times 0 = 0$ |

As another example, the result of applying the 2D Gaussian mask 710 to the thirteenth area of the target area 630 is shown in Table 3 below. Here, the thirteenth area represents an area obtained by shifting the first area 631 downward by three spaces in the target area 630. In Table 3, when all field values are added, 0.3 (733) is obtained.

TABLE 3

| | | | | |
|---|---|---|---|---|
| $0 \times 0 = 0$ | $0.1 \times 0 = 0$ | $0.2 \times 0 = 0$ | $0.1 \times 0 = 0$ | $0 \times 0 = 0$ |
| $0.1 \times 0 = 0$ | $0.3 \times 0 = 0$ | $0.5 \times 0 = 0$ | $0.3 \times 0 = 0$ | $0.1 \times 1 = 0.1$ |
| $0.2 \times 1 = 0.2$ | $0.5 \times 0 = 0$ | $0.9 \times 0 = 0$ | $0.5 \times 0 = 0$ | $0.2 \times 0 = 0$ |
| $0.1 \times 0 = 0$ | $0.3 \times 0 = 0$ | $0.5 \times 0 = 0$ | $0.3 \times 0 = 0$ | $0.1 \times 0 = 0$ |
| $0 \times 0 = 0$ | $0.1 \times 0 = 0$ | $0.2 \times 0 = 0$ | $0.1 \times 1 = 0.1$ | $0 \times 0 = 0$ |

The controller 40 may obtain a result such as '730' by sequentially applying the 2D Gaussian mask 710 in the above-described method.

Thereafter, the controller 40 may obtain an average value 740 of results 730 of sequentially applying the 2D Gaussian mask 710. The average value 740 may be a characteristic value of the object 510 corresponding to the target area 630.

Thereafter, when the average value 740 is less than a first threshold, the controller 40 may decrease the score of the object 510 in proportion to the average value 740. In other words, the controller may determine a result obtained by multiplying the score of the object 510 by the average value 740 as the score of the object 510. Here, the score may include a reliability value.

Also, the controller 40 may change the first threshold according to the separation distance from the object 510. For example, the controller 40 may lower the first threshold as the separation distance from the object 510 decreases.

Then, when the score of the object 510 is less than a second threshold, the controller 40 may delete the object 510 from the image. The result is as shown in FIG. 8.

FIG. 8 is a view showing a result of deleting a misrecognized object in a controller included in a device for filtering out a misrecognized object in an image according to an embodiment of the present disclosure.

As shown in FIG. 8, it can be seen that the object 510 determined as a misrecognized object by the controller 40 has been deleted. The controller 40 may determine whether all objects in an image each of which a detection reliability value is less than a preset value is a misrecognized object.

FIG. 9A is a first diagram illustrating performance of a device for filtering out a misrecognized object in an image according to an embodiment of the present disclosure.

As shown in FIG. 9A, it can be seen that the image recognition model has misrecognized a sound barrier outside a road as an object 910. However, the device according to an embodiment of the present disclosure has removed the misrecognized object 910.

FIG. 9B is a second diagram illustrating performance of a device for filtering out a misrecognized object in an image according to an embodiment of the present disclosure.

As shown in FIG. 9B, it can be seen that the image recognition model has misrecognized the attachment of a guardrail as an object 920. However, the device according to an embodiment of the present disclosure has removed the misrecognized object 920.

FIG. 9C is a third diagram illustrating performance of a device for filtering out a misrecognized object in an image according to an embodiment of the present disclosure.

As shown in FIG. 9C, it can be seen that the image recognition model has misrecognized a facility outside a road as an object 930. However, the device according to an embodiment of the present disclosure has removed the misrecognized object 930.

FIG. 10 is a performance analysis diagram of a device for filtering out a misrecognized object in an image according to an embodiment of the present disclosure.

As shown in FIG. 10, it can be seen that the number of misrecognized objects decreased from 1895 to 1040 in 'Easy' mode, the number of misrecognized objects decreased from 6078 to 3949 in 'Moderate' mode, and the number of misrecognized objects decreased from 748 to 712 in 'Hard' mode. As a result, it can be seen that the performance of the device for filtering out a misrecognized object in an image according to an embodiment of the present disclosure is excellent because the number of misrecognized objects is significantly reduced in all modes.

FIG. 11 is a flowchart of a method of filtering out a misrecognized object in an image according to an embodiment of the present disclosure.

First, the camera sensor 20 may capture an image of the surroundings of the vehicle (1101).

Then, the controller 40 may recognize an object and a road area in the image (1102).

Thereafter, the controller 40 may determine a target area corresponding to the object (1103).

The controller 40 may determine whether or not the object is a misrecognized object based on the target area (1104).

Subsequently, the controller 40 may delete the misrecognized object from the image (1105).

FIG. 12 is a block diagram illustrating a computing system for executing a method of filtering out a misrecognized object in an image according to an embodiment of the present disclosure.

Referring to FIG. 12, the method of filtering out a misrecognized object in an image according to an embodiment of the present disclosure described above may be implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an erasable programmable ROM (EPROM), an EEPROM, a register, a hard disk, a removable disk, and a compact-disk ROM (CD-ROM). The storage medium may be coupled to the processor 1100 and the processor 1100 may read information out of the storage medium and may record information in the storage medium. Alternatively, the storage medium may be integrated with the processor 1100. The processor 1100 and storage medium may reside in an application-specific integrated circuit (ASIC). The ASIC may reside within a user terminal. The processor 1100 and the storage medium may also reside in the user terminal as separate components.

The above description is merely illustrative of the technical idea of the present disclosure. Various modifications and variations may be made without departing from the essential characteristics of the present disclosure by those having ordinary skill in the art to which the present disclosure pertains. Accordingly, embodiments disclosed in the present disclosure are not intended to limit the technical idea of the present disclosure but instead to describe the present disclosure. The scope of the technical idea of the present disclosure is not limited by the embodiments. The scope of protection of the present disclosure should be interpreted by the following claims, and all technical ideas within the scope equivalent thereto should be construed as being included in the scope of the present disclosure.

The device and method for filtering out a misrecognized object may recognize at least one object and a road area in an image using a deep learning-based image recognition model. The device and method may also determine a target area corresponding to each object in the image and detect a misrecognized object by performing 2D Gaussian filtering on each target area. The device and method may also delete the misrecognized object from the image. This allows an autonomous vehicle to recognize objects located on a road with high accuracy and also allows a user to improve the reliability the autonomous vehicle.

Hereinabove, although the present disclosure has been described with reference to embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

What is claimed is:

1. A device for filtering out an object, the device comprising:
   a camera sensor configured to capture an image of surroundings of a vehicle; and a controller configured to recognize the object and a road area in the image, determine a target area corresponding to the object, determine whether or not the object is a misrecognized object based on the target area, and delete the misrecognized object from the image,
   wherein the controller is configured to determine the target area corresponding to the object based on a separation distance from the object.

2. The device of claim 1, wherein the controller is configured to determine an area located downward of the object as the target area.

3. The device of claim 1, wherein the controller is configured to determine a margin and a scale of the target area corresponding to the object based on the separation distance from the object.

4. The device of claim 1, wherein the controller is configured to determine whether the object is misrecognized by performing two-dimensional (2D) Gaussian filtering on the target area.

5. The device of claim 1, wherein the controller is configured to determine whether the object is the misrecognized object by performing 2D Gaussian filtering on the target area of the object when a reliability value of the object is less than or equal to a preset value.

6. The device of claim 1, wherein the controller is configured to:
   calculate a sum of results obtained by sequentially applying a 2D Gaussian mask within the target area;
   reduce a score of the object corresponding to the target area in proportion to an average of the sum when the average of the sum is less than a first threshold; and
   determine that the object is the misrecognized object when the score of the object is less than a second threshold.

7. The device of claim 6, wherein the controller is configured to change the first threshold according to the separation distance from the object.

8. The device of claim 6, wherein the controller is configured to reduce the first threshold as the separation distance from the object decreases.

9. A method for filtering out an object, the method comprising:
   capturing, by a camera sensor, an image of surroundings of a vehicle;
   recognizing, by a controller, the object and a road area in the image;
   determining, by the controller, a target area corresponding to the object;
   determining, by the controller, whether or not the object is a misrecognized object based on the target area; and
   deleting, by the controller, the misrecognized object from the image,
   wherein the determining of the target area corresponding to the object includes determining, by the controller, the target area corresponding to the object based on a separation distance from the object.

10. The method of claim 9, wherein determining the target area corresponding to the object includes determining, by the controller, an area located downward of the object as the target area.

11. The method of claim 9, wherein determining the target area corresponding to the object includes determining, by the controller, a margin and a scale of the target area corresponding to the object based on the separation distance from the object.

12. The method of claim 9, wherein determining whether or not the object is the misrecognized object includes determining, by the controller, whether the object is misrecognized by performing two-dimensional (2D) Gaussian filtering on the target area.

13. The method of claim 9, wherein determining whether or not the object is the misrecognized object includes determining, by the controller, whether the object is the misrecognized object by performing 2D Gaussian filtering on the target area of the object when a reliability value of the object is less than or equal to a preset value.

14. The method of claim 9, wherein determining whether or not the object is the misrecognized object includes:

calculating, by the controller, a sum of results obtained by sequentially applying a 2D Gaussian mask within the target area;

reducing, by the controller, a score of the object corresponding to the target area in proportion to an average of the sum when the average of the sum is less than a first threshold; and determining, by the controller, that the object is the misrecognized object when the score of the object is less than a second threshold.

15. The method of claim 14, wherein reducing the score of the object corresponding to the target area in proportion to the average of the sum includes changing, by the controller, the first threshold according to the separation distance from the object.

16. The method of claim 14, wherein reducing the score of the object corresponding to the target area in proportion to the average of the sum includes reducing, by the controller, the first threshold as the separation distance from the object decreases.

* * * * *